United States Patent [19]
Medeksza

[11] Patent Number: 5,113,728
[45] Date of Patent: May 19, 1992

[54] METHOD AND APPARATUS FOR FORMING INTERMITTENT CHIPS WHEN MACHINING A ROTATING WORKPIECE

[76] Inventor: Ludwik A. Medeksza, 3175 W. 42nd St., Erie, Pa. 16506

[21] Appl. No.: 596,041

[22] Filed: Oct. 11, 1990

[51] Int. Cl.$^5$ .......................... B23B 3/28; B23B 1/00
[52] U.S. Cl. ...................................... 82/1.11; 82/137; 82/134; 82/904; 408/17; 408/1 R
[58] Field of Search ..................... 82/118, 132–134, 82/137, 1.11, 158, 904; 408/17, 1 R

[56] References Cited

U.S. PATENT DOCUMENTS

| | | | |
|---|---|---|---|
| 3,174,404 | 3/1965 | Findley | 82/158 X |
| 3,477,320 | 11/1969 | Findley | 82/1.11 X |
| 4,165,661 | 8/1979 | Wasco, Jr. et al. | 82/129 X |
| 4,350,054 | 9/1982 | Werth, Jr. | 82/137 X |
| 4,667,546 | 5/1987 | Dombrowski | 82/137 X |
| 4,693,146 | 9/1987 | Dombrowski | 82/137 X |
| 4,939,962 | 7/1990 | Wittkopp et al. | 82/1.11 |
| 5,019,115 | 5/1991 | Schneider et al. | 81/1.11 |

FOREIGN PATENT DOCUMENTS 1440611  11/1988  U.S.S.R. ................. 82/1.11

OTHER PUBLICATIONS

L. Medeksza et al., "Vibratory Turning", Conference on Increasing Productivity of Machining Processes, pp. 34–53, Wroclaw, Poland, Sep., 1976.

*Primary Examiner*—Larry I. Schwartz
*Assistant Examiner*—Julie R. Daulton
*Attorney, Agent, or Firm*—Brooks & Kushman

[57] ABSTRACT

The formation of intermittent chips or chip breakage are assured while machining a rotating workpiece by causing the undeformed chip thickness to vary periodically and be reduced to zero in each period of its variation. To obtain the periodic reduction of the undeformed chip thickness to zero, a cutting tool is made to oscillate along its feed advance path. Tool oscillation is controlled so that the tool's position depends on the angular displacement of the rotating workpiece. The number of cycles of tool oscillation per revolution of the workpiece may be freely chosen depending on the required length of chip segments. The oscillation amplitude needed to form intermittent chips depends on this number, feed advance per revolution, and number of simultaneously applied cutting edges of the tool. The oscillatory movement of the tool may be enforced in many ways. This method may be used in all machining operations where the workpiece rotates and the tool performs a feed motion, such as boring, drilling, reaming, and turning.

20 Claims, 12 Drawing Sheets

METHOD AND APPARATUS FOR FORMING INTERMITTENT CHIPS WHEN MACHINING A ROTATING WORKPIECE

FIELD OF THE INVENTION

The invention relates to a method for forming an intermittent chip and producing separate chip segments or chip breaking while machining a rotating workpiece, by varying the chip thickness and reducing it periodically to zero. The invention further relates to an apparatus for carrying out the method of the invention.

DESCRIPTION OF THE PRIOR ART

Contemporary automated machine tools distinguish themselves with relatively high productivity. This productivity results both from the elimination of manual labor and the application of high cutting velocity using advanced cutting tool materials. Such factors are especially important in light of the current trend toward a totally unmanned factory in the not-so-distant future.

However, during machining of the vast majority of materials used in machine industry today, we encounter an unwelcome obstacle. As a by-product of the machining processes, continuous chips are formed. These chips create serious problems connected with chip formation during machining. Continuous chips have a tendency to accumulate in the limited working space surrounding a tool. This is difficult to overcome and is an obstruction to the efficient utilization of automated tooling. Moreover, the chips frequently cause, if left unattended, premature wear and/or failure of the tooling as well as damage to the machined surface. Additionally, continuous chips can become entangled about the tool, the workpiece, and/or rotating elements of the machine tool system.

Generally, unless monitored and removed constantly from the working space, such chips are hazardous to the tool, the machine, the quality of the product, and the operator (if any). Unfortunately, in practice, the removal of whirling chips can usually be accomplished only manually. But such manual labor applied to automatic machine tools, including NC and CNC machine tools, contradicts fundamental principles of their economic utilization in a manufacturing process. Conventional approaches inevitably lead to only partial utilization of expensive automatic machine tools because problems with continuous chips are characteristic of high cutting speed and feed rate. In addition, even the chips produced at lower cutting speeds and feed rates frequently maintain their continuous form. However, by using the apparatus and method of the present invention in machine shop practice, the necessity of manual chip removal is simply avoided.

Continuous chips may also cause troublesome blocking of valuable space on the shop floor around machine tools. Transportation, handling, storage and further processing of continuous chips in bulk also present major economic problems. It pays, in many cases, to use special crushing machines which crumble continuous chips and turn them into a loose collection of short segments. The volume occupied by well-broken chips is about one sixteenth the volume of unbroken chips, which is a considerable advantage when it comes to handling and disposal. Moreover, their value as scrap significantly increases as compared with the value of continuous chips due to their higher unit weight, easier elimination of lubricant, and easier making of brickettes.

Conventional chip-curling breakers would have solved such problems long ago if they were effective and reliable. Although cheap and simple, they are, however, ineffective beyond the narrow ranges of cutting parameters for which they are designed. Any change in cutting speed, feed rate, and depth of cut affects the performance of conventional chip breakers. In addition, for many materials, usually referred to as "difficult-to-machine" or "space-age materials", they are entirely ineffective. Economically, the most disadvantageous feature of traditional chip breakers is that their use shortens the effective life of a cutting tool, because the chip-breaking action is far outlasted by the tool itself.

In the prior art, various modes of vibration applied to the cutting tool have been tried as a means for chip breaking. However, tool vibration alone does not assure a reliable way of obtaining intermittent chips because chip breakage is a function of the tool position along its feed advance path and the angular position of the rotating workpiece. Uncontrolled periodic variation of chip thickness may produce chips having a thickness which is only randomly reduced to zero. But this causes equally uncontrolled and random chip separation or breaking.

In order to provide additional background information so that this invention may be completely understood and appreciated in its proper context, reference may be made to the following publication and patents, the disclosures of which are herein incorporated by reference: L. Medeksza, et al., "Vibratory Turning", Conference on Increasing Productivity of Machining Processes, pp. 34—53, Wroclaw, Poland, September, 1976; U.S. Pat. Nos. 4,667,546; and 4,693,146, both patents being issued to Dombrowski, et al.

My September, 1976 article discloses an oscillatory tool post for kinematic chip breaking when machining a rotating workpiece. The apparatus disclosed was based on synchronizing tool oscillation with a machine tool spindle rotation by coupling a hydraulic oscillation generator with the spindle by means of a belt transmission. Although an improvement over methods and devices mentioned earlier, the apparatus has, however, several disadvantages. The dependence of the tool position along its feed advance path on the angular position of the rotating workpiece mentioned above was only partly obtained. That is, there was lack of sufficient control over the tool position along its feed advance path relative to the angular position of the rotating workpiece caused by slippage between spindle rotation and tool oscillation introduced by the belt transmission. Additionally, the hydraulic oscillation generator does not control the draft of the neutral point of the oscillation. This causes a need to support the slide of the tool post with a spring to reduce the draft of the tool to certain extent. The slippage and the drift combined together, cause lack of sufficient control over the tool position along its feed advance path relative to the angular position of the rotating workpiece. Another disadvantage is that adjustment or change of chip segment length is practically difficult and limited because it requires change of pulleys in the belt transmission. Also, the need to include a hydraulic power unit and a pair of high pressure hydraulic hoses into the apparatus is an evident disadvantage due to, respectively, excessive energy consumption and inconvenience.

U.S. Pat. Nos. 4,667,546 and 4,693,146 disclose a similar method and a corresponding apparatus. But that method is limited to a turning operation and makes it impossible to find and use key operating parameters, to be discussed later, including the optimum phase $\phi$, and the optimum double amplitude-to-feed ratio $2A/p$. Such parameters are based on the requirements of the minimum roughness of the machined surface and/or maximum tool life. Moreover, the Dombrowski, et al. references allow only one value of the phase $\phi$ and only one value of the double amplitude-to-feed ratio $2A/p$. This makes it impossible to use that method for other values of the two parameters, for which a better surface finish and/or longer tool life can be achieved. Also, that method is based on the use of a tool with only a single cutting edge. This makes it impossible to use the method while boring, drilling, reaming, or turning, or where a rotating workpiece is used with more than one tool or a tool having more than one edge cutting simultaneously. In addition, that method and a corresponding apparatus is based on the use of expensive and complex hydraulic systems which enforce periodic accelerations and decelerations of heavy machine tool subassemblies, such as carriages. This makes that method costly and limits its application to a machine for which it has specifically been designed. Moreover, driving a heavy machine tool carriage at a periodically varying velocity causes, due to huge masses subjected to periodic accelerations and decelerations, undesirable strong dynamic forces which adversely affect the machine tool, the accuracy of machining, and the machined surface roughness. These are particularly serious and critical limitations when machining at high rotary speeds of the workpiece because they demand a high frequency of the carriage velocity variation that causes excessive inertia forces. Practically, that method and the apparatus is limited to turning workpieces of large diameters, such as railroad wheel sets, at a small number of chip segments per revolution of the workpiece. In fact, one and half chip segments per workpiece revolution is specifically disclosed and claimed therein. Another disadvantage of the Dombrowski, et al. apparatus is that the tool position is not directly dependent on angular position of the workpiece. The rotary speed of the machine tool spindle is measured and the tool oscillation frequency is adjusted accordingly to achieve chip breaking. This indirect approach introduces undesired errors which result from an inaccuracy of tool oscillation frequency adjustment relative to a change in spindle r.p.m., and causes certain range of phase $\phi$ values within which the actual phase $\phi$ is out of control. This is manifested in limited control over the texture or topography of the machined surface. However, by the method of the present invention, such errors have been eliminated due to the direct dependence of the position of tool on the angular position of the workpiece.

Upon review of prior art based on application of tool vibration, it may be observed that intermittent chip forming has been obtained only randomly, depending on constantly changing phase $\phi$ due to absence of the dependence of tool position on the angular workpiece position.

Whatever the precise merits, features and advantages of the known prior art, including the above discussed references, none achieves or fulfills the purposes of the method and apparatus of the present invention. To advance the art, it is necessary that the cutting tool be made to occupy strictly determined and controlled positions along its feed advance path in response to angular positions of a rotating workpiece when cutting. Also, full flexibility is needed in selecting critical operating parameters, such as phase $\phi$ and the ratio $2A/p$ to obtain the best surface finish and the longest tool life. Additionally, it would be desirable to apply the method to all machining operations that can be performed on a rotating workpiece.

OBJECTS OF THE INVENTION

In view of the foregoing it is an aim of the invention to achieve the following objects singly or in combination:

to provide a method for the reliable production of intermittent chips—that is, chips which are produced consistently in the form of short segments when machining a rotating workpiece using a multi-edge tool, a certain number of single-edge tools, or a single-edge tool, for example, when conducting such operations as counterboring, countersinking, drilling, reaming, boring or turning;

to provide a method for machining with various values of critical operating parameters, such as the phase $\phi$ and/or the double amplitude-to-feed ratio $2A/p$ to obtain an optimal surface finish and/or the maximum tool life;

to provide a method by which full control is achieved over the machined surface texture or topography;

to achieve uniform chip segments of predetermined length;

to provide an apparatus for carrying out such a method and its improvements which is of compact construction;

to provide such an apparatus which makes the cutting tool occupy strictly determined and controlled positions along its feed advance path in response to the angular position of the rotating workpiece when cutting;

to provide such an apparatus which comprises as small a mass as possible which is subjected to periodic acceleration and deceleration, to facilitate the machining of workpieces of small diameters at high rotary speed;

to provide such an apparatus in a form that fits most standard machine tool carriages and/or allows for easy adaptation;

to allow such an apparatus to be used for many modes of machining such as boring, counterboring, countersinking, drilling, reaming, turning, etc.; and to allow such an apparatus to be used with longitudinal feed, as when boring a cylindrical hole, as well as with transverse feed, as when cutting off or facing.

SUMMARY OF THE INVENTION

The above-described problems and objects may be solved and met by the method and apparatus of the invention, wherein a cutting tool is made to occupy strictly determined and controlled positions along its feed advance path in response to angular positions of a rotating workpiece when cutting, so that the undeformed chip thickness periodically varies and is reduced to zero in each period of its variation. As a result, intermittent chips are formed. Instead of a long band, short, convenient-to-handle chip segments are produced. The chip segment's length can be selected freely by choosing the number of the segments obtained during one workpiece revolution. A tool nose moves along a wavy path relative to the workpiece. The path wave has a certain amplitude A and length λ. The number of lengths per circumference of the machined surface is equal to the number of the chip segments obtained during one workpiece revolution.

The relation between positions of the cutting tool and positions of the rotating workpiece, which may be freely adjusted, is independent of the rotary speed of the workpiece. Hence, once a given relation has been chosen by selecting the amplitude of the tool path wave and the desired number of the segments to be produced during one workpiece revolution, this relation is not affected by changes in rotary speed of the workpiece. If the rotary speed is maintained constant, a periodically varying feed advance velocity is produced that consists of a constant component and a periodically varying component. The constant component is defined as a distance p travelled by the tool nose along a feed advance path per time needed for one revolution of the workpiece. The constant component of the feed advance velocity is produced, in the preferred embodiment of the invention, by the feed motion of a machine tool carriage or slide. The periodically varying component of the tool's feed advance velocity is produced, in the preferred embodiment of the invention, by causing the tool to oscillate relative to the machine tool carriage. However, it may be produced also by causing the entire carriage, or other tool supporting subassembly of a machine tool, for instance a cross-slide, to move with periodically varying feed advance velocity.

DETAILED DESCRIPTION OF THE BEST MODES FOR CARRYING OUT THE INVENTION

Figure 1:
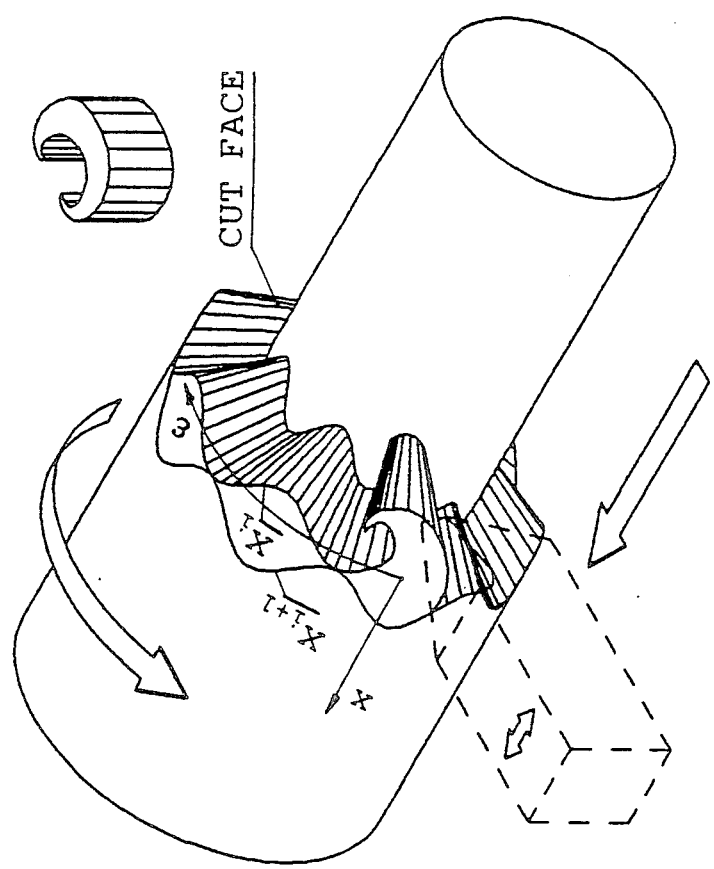
FIG. 1 is a perspective view that illustrates the principle of kinematic chip breaking upon which this invention is based.
Figure 2:
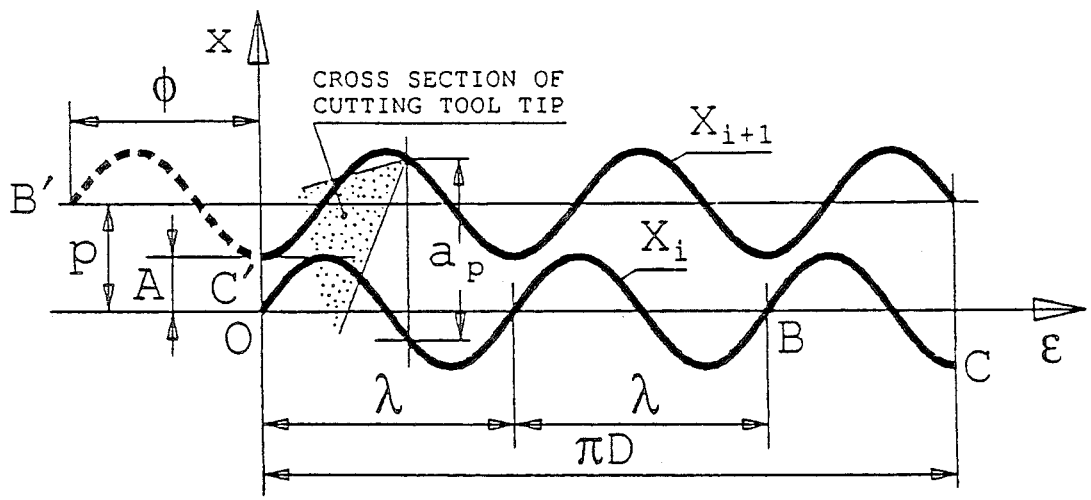
FIG. 2 is a graph which shows two developed coils of tool nose path.

Turning first to FIG. 1 of the drawings, there is illustrated in phantom a tool nose which describes a wavy path in relation to a workpiece. The same waviness as that of the tool nose path is left by the major cutting edge on the cut surface. The path wave has a certain amplitude A and length λ (FIG. 2). Neglecting a slight inclination of the tool nose path helical line, two developed consecutive coils of the tool nose path are shown in FIG. 2. The axis x is parallel with the direction of the feed motion vector and represents the feed advance path. A value of x corresponds with an instantaneous tool nose position in this direction. The angular displacement of the tool nose and the cutting edge during its oscillation is represented along the ε axis by the formula:

$$\epsilon = \omega t \quad (1)$$

where ω is the circular frequency of tool oscillation. The distance between the neutral lines of the tool nose path coils equals the distance p which defines the constant component of the feed advance velocity.

Assuming a sine form of tool nose path waviness, it is possible to take advantage of the concept of a phase shift as used in harmonic analysis. Thus, it is apparent in FIG. 2 that the path coil $X_{i+1}$ is shifted relative to the path coil $X_i$ in the direction of the axis ε. The quantity φ determines the phase, which is the same between any two consecutive tool nose path coils. If the cutting tool nose moves, during a given interval, along the path coil $X_{i+1}$ (compare FIG. 2 and FIG. 1), a form of the path coil $X_i$ defines the shape of the upper uncut chip surface and a form of the path coil $X_{i+1}$ defines the lower one, i.e. the shape of the cut face. Hence, a value of φ determines also the phase shift of the cut face relative to the upper surface of the uncut chip. The value of φ is obtained from the equation:

$$\phi = 2\pi[N - I(N)] \quad (2)$$

where N is a selected number of waves of the wavy tool nose path per circumference of the machined surface and I(N) is the integer part of N.

Owing to tool oscillation and the resulting cut face waviness, the uncut chip thickness $a_p$ is being periodically changed during machining. But, to obtain intermittent chip forming, changing the thickness is not sufficient. The thickness must periodically be reduced to zero, that is, the curves representing any two consecutive tool nose path coils must have points of tangency or they must intersect.

Figure 3:
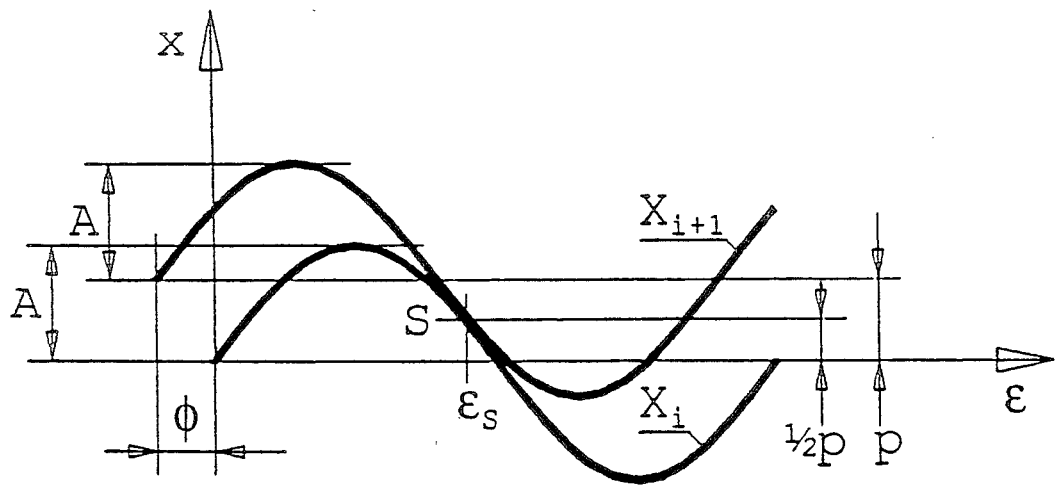
FIG. 3 is a graph which shows any two coils of tool nose path that meet the condition for intermittent chip forming.

In general, as shown in FIG. 3, this condition corresponds to contacting the sine curve $X_i$ and the sine curve $X_{i+1}$ at least at the point S. From this assumption, the following inequality involving the double amplitude ratio 2A/p results:

$$2\frac{A}{p} \geqq \operatorname{cosecant}\left(\frac{\phi}{2}\right) \quad (3)$$

where A is the amplitude of tool path wave, p is the distance between neutral lines of any two consecutive tool nose path coils and $\phi$ is the phase shift as explained above.

The inequality defines the condition for intermittent chip forming when a tool is used that has only one major cutting edge, as when turning an outside surface of revolution or boring an inside surface of revolution using a single tool. However, for certain materials of workpiece that show some brittleness, the chip can break into separate segments even before this condition is met, that is, when the amplitude A is slightly less than that resulting from the inequality (3).

For phase $\phi$ values equal to $0, 2\pi, 4\pi, \ldots$ etc., obtaining intermittent chip forming is impossible independently of the amplitude of the tool path wave. These values as well as all others in ranges $0-0.25\pi$, $1.75\pi-2.25\pi$, $3.75\pi-4.25\pi$, $5.75\pi-6.25\pi \ldots$ etc., should be avoided, since they require an impractically great amplitude of the tool path wave to cause intermittent chip forming. This is best seen from the graph of FIG. 4.

Figure 4:
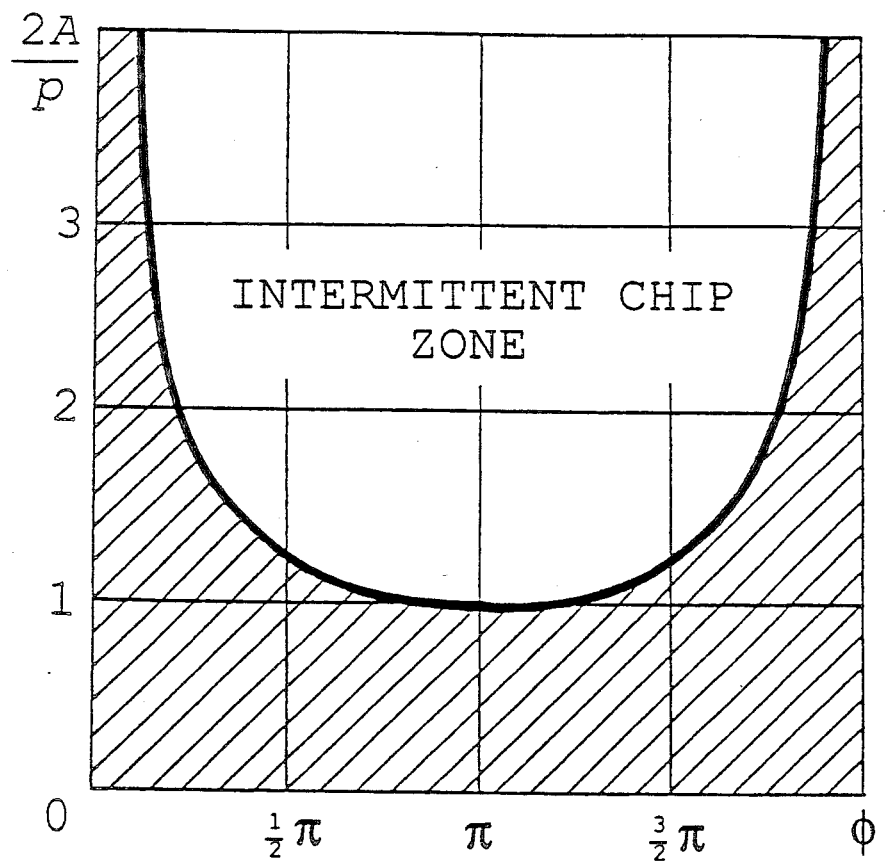
FIG. 4 is a graph of certain parameters that illustrate a zone of intermittent chip forming.

Roughness of the machined surface depends very strongly, among other factors, on the double amplitude ratio 2A/p and the phase shift $\phi$. Also, tool life is affected by these parameters. However, in U.S. Pat. Nos. 4,667,546 and 4,693,146, the chip separation or breaking has been limited to the point of coordinates $\phi = \pi$, $2A/p = 1$, only. The point is best seen in FIG. 4. This disadvantage makes it impossible to machine workpieces at phase $\phi$ values and/or ratio 2A/p values to achieve minimum roughness and/or the desired topography of the machined surface, as well as maximum tool life which, in most cases known to the Applicant, lie beyond this point. The present invention provides that the best attainable or the most desired combination of phase $\phi$ and amplitude A may be used to achieve the best surface finish and the longest tool life.

Figure 5:
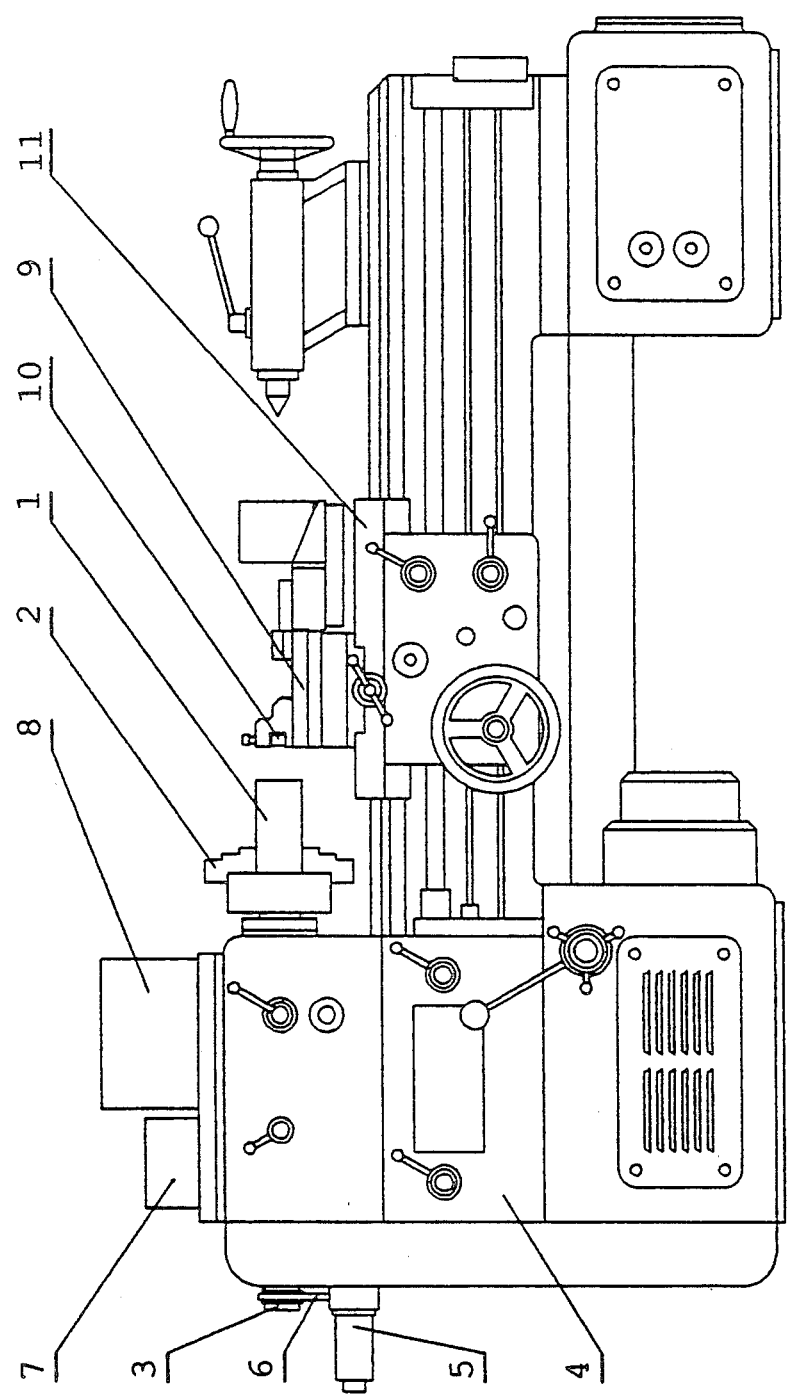
FIG. 5 is a front elevational view of an engine lathe equipped with an apparatus according to the present invention for producing an intermittent chip.
Figure 6A:
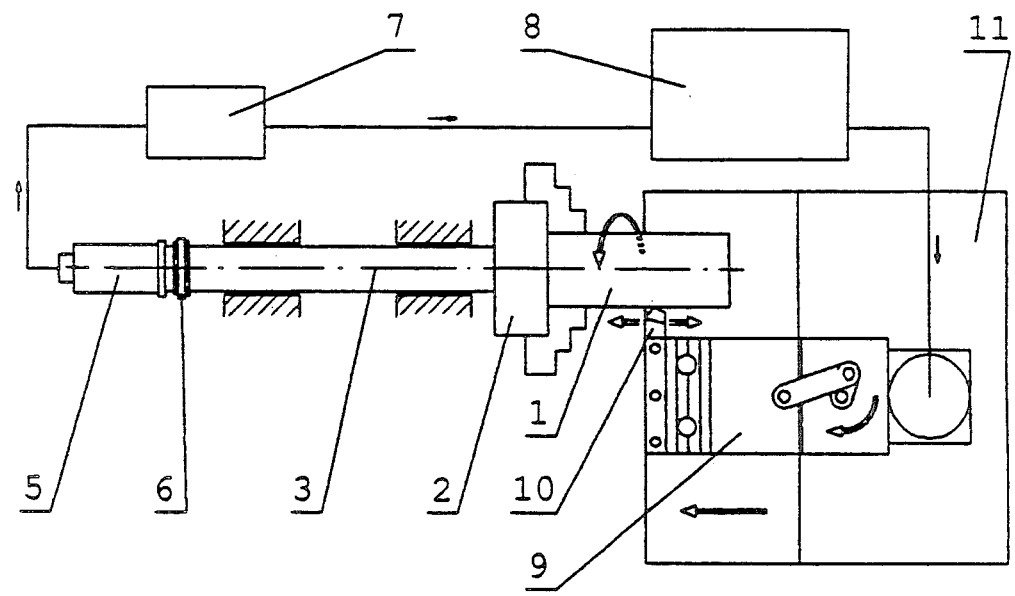
FIGS. 6(a) and (b) are top plan and front elevational views of the apparatus according to the present invention for producing an intermittent chip.
Figure 6B:
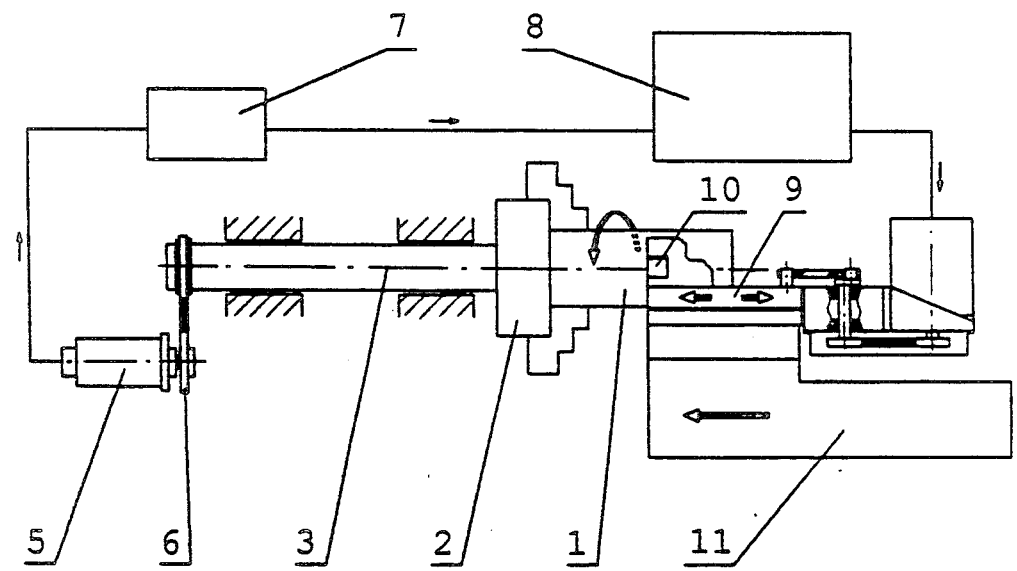

As shown in FIGS. 5 and 6, in the preferred embodiment of this invention, a machine tool's spindle and its driving system provide the workpiece drive means for causing rotation of a workpiece. Also, tool means are provided to make it possible to reduce material contained in a machining allowance layer to chips. It should be understood that the term "tool means," is not limited to only a turning tool or a lathe tool having only one major cutting edge. It is intended to include also various sets of turning or lathe tools as well as tools having n-edges, where n is a natural number, such as boring bars, counterbores, countersinks, drills, reamers, and other types of cutting tools which are or can be used to machine a rotating workpiece and which otherwise produce continuous chips.

A formula is provided, in accordance with this invention, that makes it possible to compute and adjust, manually or automatically, the amplitude A of the tool nose path waviness needed to achieve intermittent chip. The formula is as follows:

$$A \geq \left| \frac{p}{2n} \operatorname{cosecant}\left(\frac{N}{n}\pi\right) \right| \quad (4)$$

where n is number of cutting edges in the tool means used, p is the distance between neutral lines of any two consecutive tool nose path coils produced by a given tool nose, and N is a selected number of waves of the wavy tool nose path per circumference of the machined surface. The inequality defines the condition for intermittent chip forming when tool means are used that have any number n of major cutting edges. As stated earlier, the approach disclosed herein is not limited to a tool that has only one major cutting edge.

In order to carry out the method of the invention, feed drive means are provided for overcoming the force which resists machining that acts along the feed advance path, and for driving the tool means so that the tool nose path is wavy and the distance p is constant and adjustable.

To obtain the constant distance p between any two consecutive tool nose path coils produced by a given tool nose, a machine tool carriage or slide is used. The carriage or slide is coupled kinematically with the machine tool spindle so that the carriage or slide travels always a constant distance p per one workpiece revolution. The total transmission ratio between the spindle rotation and carriage feed motion is easily changed or adjusted. In other words, the carriage driving system or the slide driving system provides a constant feed drive means.

The oscillatory tool motion achieved in response to the rotating workpiece angular position may be obtained in many ways. As a specific example, the tool may be driven by an electrohydraulic, mechanical or electromechanical oscillator, properly synchronized with the angular position of the workpiece being machined. Also, as mentioned earlier, a carriage or a slide of a machine tool can be given a feed motion with a velocity which periodically varies in response to the workpiece rotation.

In the preferred embodiment of the invention, an electromechanical tool oscillator is used to achieve the waviness of the tool nose path. The oscillator, in the form of a crank-slide mechanism driven by a stepping motor, constitutes a subassembly of an oscillatory tool post and provides means for producing oscillation of a tool support. The oscillatory tool post may be installed on a carriage or slide of any machine tool capable of performing boring, drilling, reaming, or turning operations on the rotating workpiece.

The spindle of a machine tool, when rotating, drives the rotor of a shaft encoder. A slipless timing belt transmission is used in this invention to transmit the spindle rotation to the encoder rotor for the encoder to sense the actual angular position of the spindle and the workpiece which is attached to the spindle. The shaft encoder, preferably a resolver, converts the angular shaft position into an electric analog signal. The analog signal is delivered from the resolver to a resolver-to-digital converter electronics unit. The unit provides means for processing the signal and producing an output signal to be further processed. The output signal, in digital form, is delivered to a motion controller. The motion controller provides means for generating a control signal that carries enough power to drive a stepping motor which is built into the oscillatory tool post. The motion controller comprises means for adjusting a selected number of waves N of the wavy tool nose path per circumference of the machined surface.

The stepping motor provides controllable drive means. The motor is capable of rotating its rotor through an angle in accordance with the control signal based on the angular position of the rotating workpiece. The adjustment of the number N is based on selecting the angle for the rotor to rotate through during a given angle of rotation of the workpiece.

The stepping motor drives a crankshaft of a crank mechanism by means of a timing belt transmission. The timing belt transmission, comprising a timing belt and two pulleys, preferably of the same diameter, provides slipless transmission means needed to avoid slippage between the stepping motor rotor and the crankshaft.

Rotation of the crankshaft, transmitted through a connecting rod to a slide saddle causes oscillatory motion of the slide saddle with respect to the slide base. The slide base is installed on the machine tool carriage and follows its motion. A tool holder mounted on the top surface of the slide saddle provides means for transmitting both the constant component and the periodically varying component of the tool's feed advance velocity to the tool means. Finally, the tool means that are held in the tool holder, follow both the constant motion of the slide base and the oscillatory motion of the slide saddle. In this way, the tool means always occupies a position along its feed advance path that is determined by an angular position of the rotating workpiece.

The amplitude of tool oscillation, in accordance with the preferred embodiment of the invention, is equal to the length of crank arm in the crank-slide mechanism. The length of the crank arm may be adjusted as required.

Figure 12:
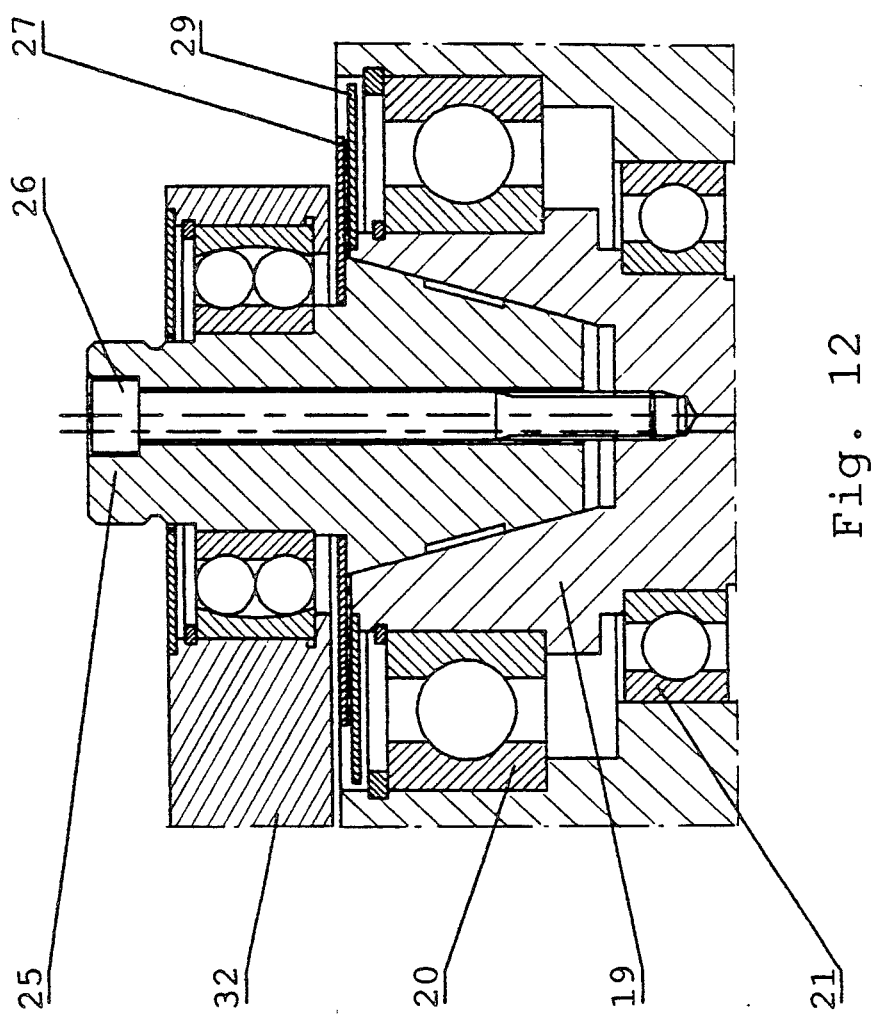
FIG. 12 is an enlarged portion of the cross sectional view of the crank 25 of FIG. 7, adjusted for zero amplitude of tool oscillation.
Figure 13:
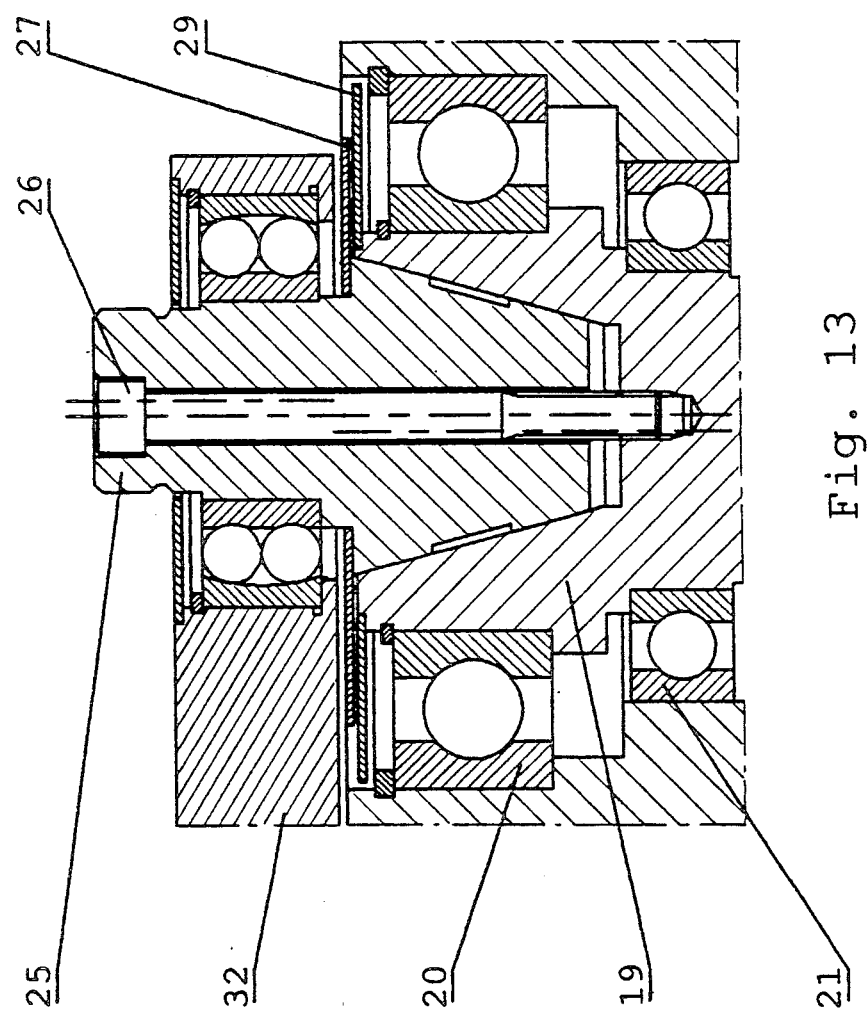
FIG. 13 is an enlarged portion of the cross sectional view of the crank 25 of FIG. 7, adjusted for maximal amplitude of tool oscillation.

As best seen in FIGS. 12 and 13, to make the adjustment possible, the crank 25 is made as a separate part from the crankshaft 19. The crank has a tapered shank that fits a tapered socket made in the crankshaft. The taper is great enough to prevent self-locking of the crank in its socket. The angular position of the crank relative to the crankshaft may be changed. To change the position, a clamping screw 26 in the crank must be loosened. Then, the crank is rotated, using its knob, relative to the crankshaft. After selecting the proper angular position of the crank using a scale of amplitude, the screw 26 is fastened again. Fastening the screw locks the crank by friction in the socket defined in the crankshaft.

Due to a certain eccentricity of the crank pin relative to the tapered shank of the crank, and the same eccentricity of the tapered socket of the crank relative to the crankshaft bearings' pins, the angular position of the crank relative to the crankshaft defines the crank arm length, and hence the amplitude of oscillation of the slide saddle that is equal to the amplitude A of the wavy tool nose path described on the machined surface. Due to the identity of these two eccentricities, there is an angular position of the crank relative to the crankshaft when the centerline of the crank bearing is aligned with the centerline of the crankshaft bearings. This position corresponds to zero amplitude of the slide saddle oscillation.

By rotating the crank through 180 degrees from this position relative to the crankshaft, the maximal amplitude of oscillation is obtained, which is equal to the sum of the two eccentricities mentioned above.

Referring back to FIGS. 5 and 6, the preferred example embodiment of this invention includes a rotating workpiece 1, secured by a chuck 2 or other attachment for holding the workpiece, and a spindle 3 mounted in a machine tool 4 for transmitting rotary motion and torque to the workpiece 1 through the chuck 2. Also depicted is a resolver 5 for sensing angular position of the spindle 3, a timing belt transmission 6 for sliplessly transmitting rotary motion of the spindle 3 to the resolver 5, and a resolver-to-digital converter electronics unit 7 for producing a digital signal proportional to the angular position of the spindle 3. In communication therewith is a programmable motion controller 8 which drives a stepping motor, and an oscillatory tool post 9 comprising the stepping motor, tool means 10, and a carriage 11 mounted in the machine tool 4 whose feed advance motion is kinematically coupled with rotation of the spindle 3.

As best seen in FIGS. 7-9 and 10, the oscillatory tool post has, at its input, a stepping motor 12 which is installed on a bracket 13. The bracket 13 is secured to the crankshaft housing 14 using bolts. A timing belt pulley 15 is mounted on the neck of the stepping motor's rotor shaft. Another timing belt pulley 16 of the same pitch diameter as that of pulley 15 is seated on the crankshaft neck. The pulleys are engaged with each other by means of a timing belt 17. Protecting the transmission is a cover 18. The crankshaft 19 is supported on two rolling bearings 20 and 21 installed in the crankshaft housing. The crankshaft housing is secured to a slide base 22 using a dowel pin 23 and two bolts and, at the bottom, it is closed with a cover 24. A tapered socket for the crank shank is defined in the upper portion of the crankshaft.

As best seen in FIGS. 12 and 13, the socket is eccentric relative to the crankshaft bearings. A crank 25 is seated in the crankshaft. The crank 25 has a tapered shank in its lower portion and a cylindrical pin in its upper portion. At the very top of the crank, a knurled knob is formed that is coaxial with the cylindrical pin. The knob makes it possible to change the angular position of the crank relative to the crankshaft. The cylindrical pin is eccentric relative to the tapered shank by the same amount of eccentricity as the socket with respect to the crankshaft bearings. A hole is made through the crank from top to bottom to contain a clamping screw 26. The screw is engaged in a threaded hole formed in the bottom of the socket in the crankshaft. The screw presses the tapered shank of the crank against the tapered socket in the crankshaft and locks the crank relative the crankshaft by friction.

Figure 11:
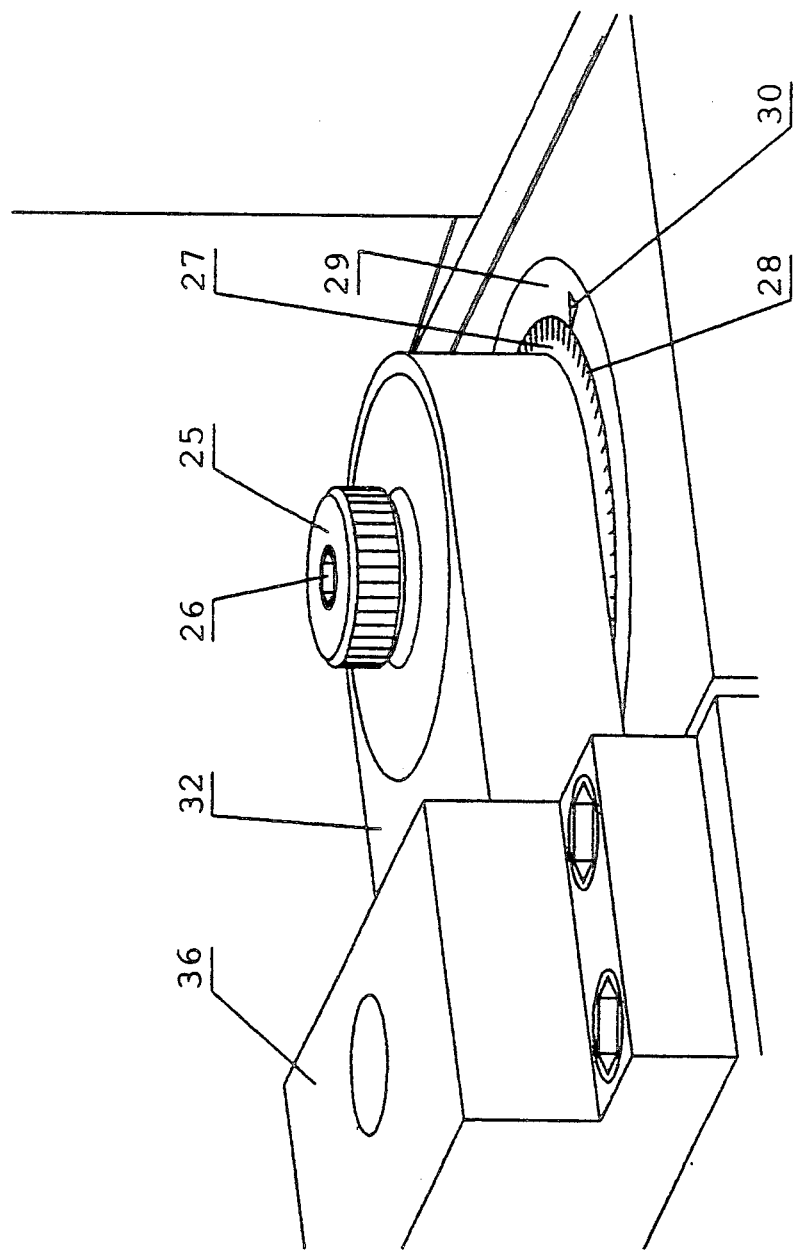
FIG. 11 is a perspective view of a portion of the device of FIGS. 9 and 10 that shows a crank knob and a scale for adjusting the amplitude of tool oscillation.

As shown in FIGS. 11-13, a circular plate 27 with a scale 28 indicating the selected amplitude of oscillation is secured to the crank 25. Another circular plate 29 of a greater diameter is secured to the top surface of the crankshaft. An indicator 30 is provided on this plate to make it possible to read out the amplitude selected.

Figure 7:
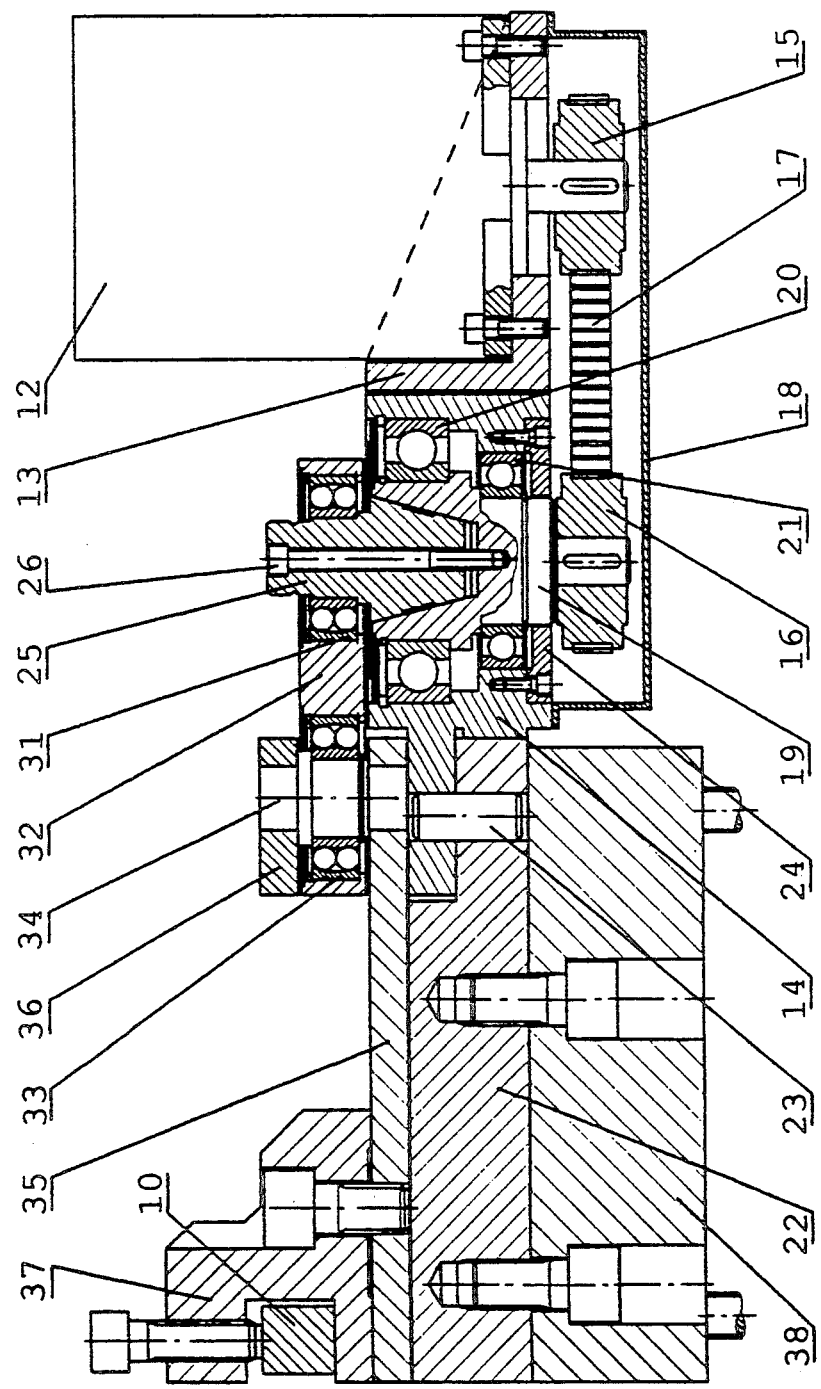
FIG. 7 is the longitudinal cross-sectional view of an oscillatory tool post according to the present invention which is shown as assembly 9 in FIGS. 5 and 6.

As best seen in FIG. 7, a self-aligning connecting rod's ball bearing 31 is mounted on the crank pin. At the other end of the connecting rod 32 another self-aligning ball bearing 33 is installed. The bearing 33 is seated on a pin 34 whose lower portion is press fitted in a hole defined in the slide saddle 35. The upper portion of the pin is supported by a bracket 36 secured to the upper surface of the saddle. At the other end of the saddle, a tool holder 37 with a tool 10 in it is mounted on the upper surface. The tool holder's design depends on the type of tool to be used in the given operation.

Figure 9:
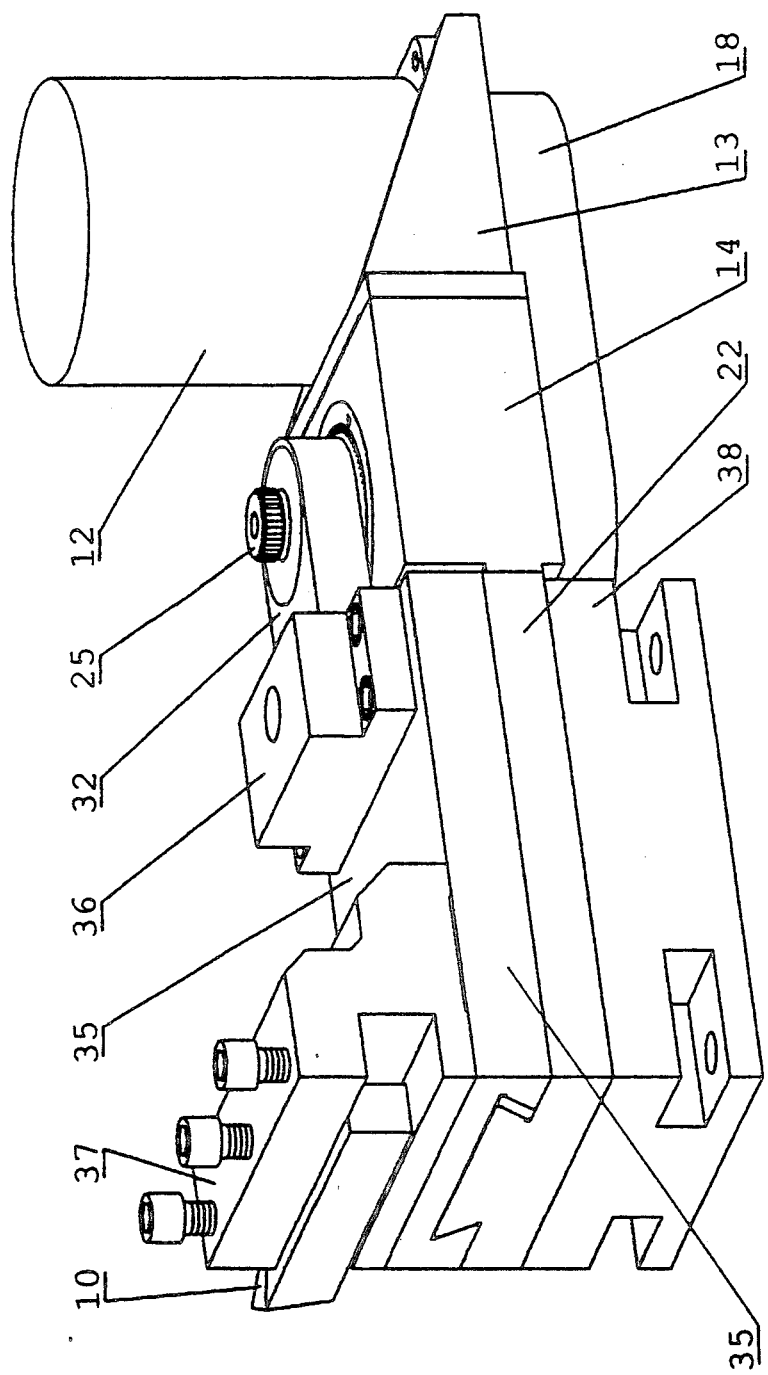
FIG. 9 is a perspective view of the oscillatory tool post of FIG. 7 with its tool holder adjusted for turning.
Figure 10:
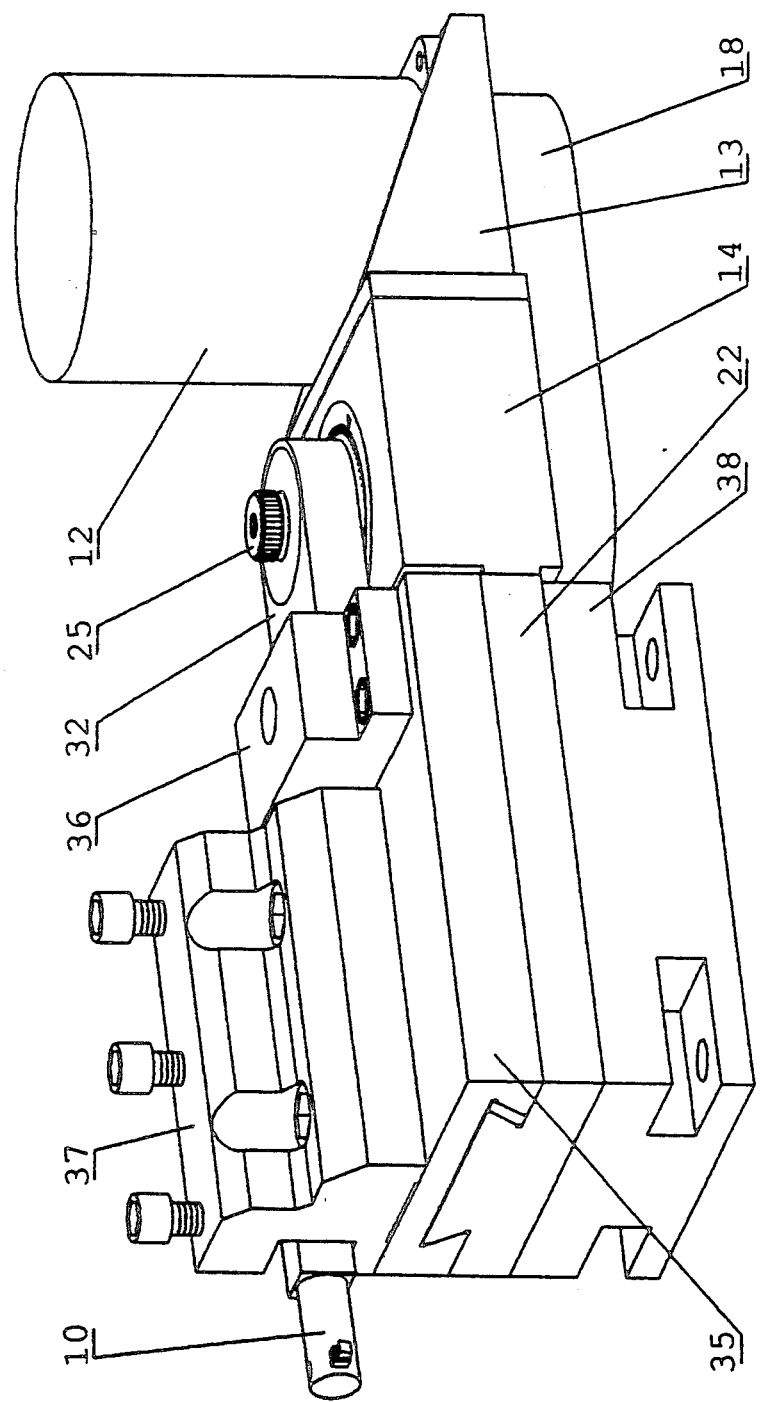
FIG. 10 is a perspective view of the oscillatory tool post of FIG. 7 with its tool holder adjusted for boring.

Turning now to FIGS. 9-10, the tool holder of the preferred design may be mounted in two different positions relative to the saddle, depending on the type of machining operation to be used, such as turning or boring. Drilling, counterboring, countersinking, and reaming require a different design (not shown).

Figure 8:
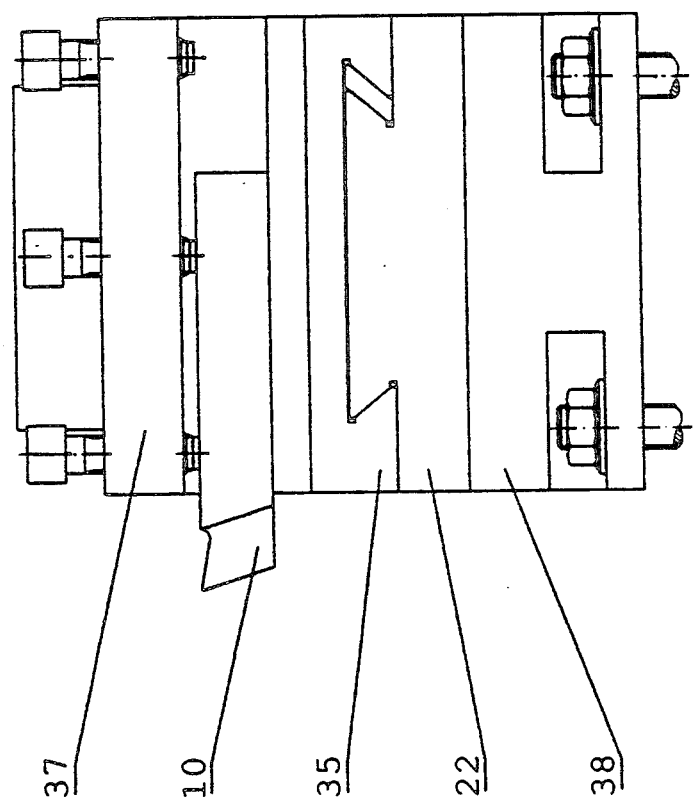
FIG. 8 is the left side elevational view of the oscillatory tool post of FIG. 7.

FIG. 8 shows that the saddle is guided by a pair of slideways in its oscillatory motion. The slideways belong in the slide base 22 which is installed on an adapter 38 whose height is selected depending on the machine tool the oscillatory tool post is to be mounted on. The oscillatory tool post must always be installed so that the slideways are parallel with the direction of the constant component of the feed advance velocity.

It follows that for cut off and facing operations, the guideways of the oscillatory tool post must be installed parallel with the guideways of the cross carriage or the cross slide of a machine tool. For other machining operations, such as drilling and reaming, as well as boring and turning cylindrical surfaces, the guideways must be parallel with the guideways of the lengthwise carriage or slide of a machine tool. For boring and turning conical surfaces, the guideways of the oscillatory tool post must be installed parallel with the generating lines of the conical surfaces.

While the best mode for carrying out the invention has been described in detail, those familiar with the art to which this invention relates will recognize various alternative designs and embodiments for practicing the invention as disclosed by the following claims.

What is claimed is:

1. A method for generating intermittent chips when machining a rotating workpiece on a machine with a tool having one or more cutting edges and a feed advance path, comprising the steps of:
   (I) rotating the workpiece about an axis of rotation coinciding with the centerline of a machined surface to be produced,
   (II) causing the tool to achieve strictly determined and controlled positions along its feed advance path in response to angular positions of the rotating workpiece when cutting, so that
      (a) a path described by the tool nose on the machined surface of the workpiece is wavy and has a constant wave amplitude A and wave length $\lambda$, said wave amplitude A and wave length $\lambda$ being capable of adjustment,
      (b) a distance p between any two consecutive paths described by the tool nose produced during any two consecutive revolutions of the workpiece is constant, said distance p being capable of adjustment, and
      (c) a phase $\phi$ is produced between waves of any two consecutive tool nose path coils produced by a given too nose, that is equal to $2\pi$, where N is a selected number of waves of said wavy tool nose path per circumference of the machined surface of said workpiece and I(N) is the integer part of said N,
   (III) controlling said amplitude A so that said amplitude A satisfies the inequality $$A \geq \left| \frac{p}{2n} \text{cosecant} \left( \frac{N}{n} \pi \right) \right|$$

where p is said constant distance, N is said selected number of waves, and n is the number of major cutting edges in the tool, whereby the undeformed chip thickness varies periodically and reduces to zero in each period of its variation, thereby generating intermittent chips, or causing in some materials chip breakage, and
   (IV) adjusting said amplitude A and said phase $\phi$ in any combination which satisfies the inequality defined in step III to achieve a desired surface finish and tool life.

2. An apparatus for forming intermittent chips when machining a rotating workpiece with a tool being fed along an advance path, comprising:
   workpiece drive means for causing rotation of the workpiece,
   tool feed drive means for overcoming forces resisting machining the workpiece which act along the tool feed advance path and for driving said tool so that the path of said tool nose described on the machined surface of the workpiece is wavy and the distance p between any two consecutive paths produced during any two consecutive revolutions of the workpiece is constant, wherein said tool nose path described on the machined surface is capable of adjustment, and feed control means in operative communication with said tool feed drive means for causing the tool to achieve strictly determined and controlled positions along said tool feed advance path in response to the angular positions of the rotating workpiece when cutting such that the amplitude A of said tool nose path satisfies the inequality $$A \geq \left| \frac{p}{2n} \text{cosecant} \left( \frac{N}{n} \pi \right) \right|$$

where p is said constant distance, N is a selected number of waves, and n is the number of major cutting edges in the tool.

3. The apparatus of claim 1, wherein said tool feed drive means comprises:
   constant feed drive means for causing the distance p between neutral lines of any two consecutive tool nose path coils, produced by a given tool nose to be constant, said distance p being capable of adjustment, and
   varying feed drive means in communication therewith for causing said tool nose path to be wavy.

4. The apparatus of claim 3, wherein said varying feed drive means comprises:
   controllable drive means for producing changes in position occupied by the tool in response to changes in angular position of the rotating workpiece,
   means for producing oscillation of a tool support in communication therewith relative to said constant feed drive means, and
   means for transmitting oscillation from said oscillating tool support to said tool.

5. The apparatus of claim 4, wherein said means for transmitting said oscillation from said tool support to said tool means comprise a tool holder mounted on said slide.

6. The apparatus of claim 4, wherein said controllable drive means comprises:
   a motor capable of rotating its rotor through an angle in accordance with a control signal based on a change in said angular position of said rotating workpiece, and
   slipless transmission means in communication therewith for transmitting the rotor rotation from said motor to said means for producing oscillation.

7. The apparatus of claim 6, wherein said slipless transmission means comprises a timing belt transmission to avoid slip between driving and driven shafts.

8. The apparatus of claim 4, wherein said means for producing oscillation of a tool support comprises a crank-slide mechanism.

9. The apparatus of claim 8, wherein said crank-slide mechanism comprises:
   a crankshaft supported on bearings,
   a connecting rod for transmitting motion to a slide which provides support to the tool,
   self-aligning bearings installed at both ends of said connecting rod,
   said slide being movably mounted on a slide base, and
   said slide base being installed on an adapter whose height and other dimensions are selected depending on the machine tool on which said slide base is mounted.

10. The apparatus of claim 9, wherein said slide base may be installed on said constant feed drive means so that guideways defined therewithin are disposed in a fixed angular relationship with the axis of rotation of said workpiece.

11. The apparatus of claim 9, wherein said crankshaft comprises a socket for installing a crank.

12. The apparatus of claim 11, wherein said socket has a conical form with a base and comprises:
   a threaded hole made in the base of the socket.

13. The apparatus of claim 11, wherein the centerline of said socket and the centerline of said crankshaft are parallel and spaced apart from each other by half the maximal desired amplitude A of said tool nose path wave.

14. The apparatus of claim 2, wherein said feed control means comprises:
   means for adjusting and controlling said constant feed drive means,
   means for sensing said angular position of said rotating workpiece in communication therewith, and
   means for generating a control signal based on the angular position to be followed by said variable feed drive means.

15. The apparatus of claim 14, wherein said means for sensing the angular position of the rotating workpiece comprises:
   a slipless transmission for transmitting workpiece rotation to a shaft encoder,
   a shaft encoder in communication therewith for sensing said angular position of said rotating workpiece and for producing a signal proportional to said angular position of said rotating workpiece, and
   means for processing said signal and producing an output signal to be further processed by said means for generating a control signal.

16. The apparatus of claim 14, wherein said means for generating a control signal comprises:
   means for adjusting a number of waves N of said wavy tool nose path per circumference of the machined surface of said workpiece, and means for adjusting a wave amplitude A of said tool nose path.

17. The apparatus of claim 16, wherein said means for adjusting said wave amplitude A comprises:
   a crank which is seated in a socket made in a crankshaft,
   a scale in communication therewith indicating said amplitude,
   an indicator for reading out said amplitude, and
   means for securing said crank in said socket to prevent a change in their relative angular position.

18. The apparatus of claim 17, wherein said means for securing said crank comprises:
   a clamping bolt for pressing said shank against said socket to lock said crank relative said crankshaft by friction.

19. The apparatus of claim 17, wherein said crank comprises:
   a shank and a cylindrical pin whose centerlines are parallel and spaced apart from each other by half a maximal required amplitude of said tool nose path,
   a knob that is coaxial with said cylindrical pin which enables adjustment of the angular position of said crank relative to said crankshaft, and a hole defined in said crank to contain said means for securing said crank.

20. The apparatus of claim 19, wherein said shank has a conical form.

* * * * *

UNITED STATES PATENT AND TRADEMARK OFFICE
CERTIFICATE OF CORRECTION

PATENT NO.   : 5,113,728
DATED        : May 19, 1992
INVENTOR(S)  : Ludwik A. Medeksza It is certified that error appears in the above-identified patent and that said Letters Patent is hereby corrected as shown below:

Col. 10, line 56      Change "tool lo" to --tool 10--;

Col. 11:
Claim 1, line 45      Delete "$2\pi$" and insert
                      --$2\pi [N-I(N)]$--;

Col. 12:
Claim 3, line 32      Change the numeral "1" to --2--.

Signed and Sealed this

Seventh Day of September, 1993

Attest:

BRUCE LEHMAN

Attesting Officer    Commissioner of Patents and Trademarks